United States Patent [19]

Someya et al.

[11] Patent Number: 4,571,032
[45] Date of Patent: Feb. 18, 1986

[54] ZOOM LENS

[75] Inventors: Atsushi Someya, Machida; Shigeyuki Suda, Tokyo, both of Japan

[73] Assignee: Canon Kabushiki Kaisha, Tokyo, Japan

[21] Appl. No.: 335,742

[22] Filed: Dec. 30, 1981

[30] Foreign Application Priority Data

Jan. 22, 1981 [JP] Japan ................................. 56-8218

[51] Int. Cl.$^4$ .......................... G02B 5/14; G02B 5/16; G02B 15/14; G02B 15/18
[52] U.S. Cl. ................................. 350/427; 350/96.25; 350/96.31; 350/413; 350/423
[58] Field of Search ............ 350/413, 423, 427, 96.25, 350/96.31

[56] References Cited

U.S. PATENT DOCUMENTS

| | | | |
|---|---|---|---|
| 3,936,149 | 2/1976 | Imai | 350/413 |
| 4,101,196 | 7/1978 | Imai | 350/413 X |
| 4,281,906 | 8/1981 | Tanaka | 350/427 |
| 4,380,383 | 4/1983 | Daintrey et al. | 355/77 X |
| 4,390,248 | 6/1983 | Ikemori | 350/427 |

Primary Examiner—John K. Corbin
Assistant Examiner—Scott J. Sugarman
Attorney, Agent, or Firm—Fitzpatrick, Cella, Harper & Scinto

[57] ABSTRACT

A zoom lens includes a zoom portion for forming a virtual image of an object lying between infinity to a very short distance always at a predetermined position and for varying the imaging magnification of the virtual image, and a relay portion including an erecting one-to-one magnification compound-eye optical system disposed between the zoom portion and an image pick-up surface for forming the virtual image of the object on the image pick-up surface.

7 Claims, 10 Drawing Figures

ZOOM LENS

BACKGROUND OF THE INVENTION

1. Field of the Invention

This invention relates to a compact zoom lens.

2. Description of the Prior Art

The conventional zoom lens systems usually comprises a zoom portion for varying the photographing magnification and a relay portion for causing the image of an object to be photographed which image is formed at a spatially fixed position by the zoom portion to be re-imaged on a film or an image pick-up element. As regards making the zoom portion compact, there has been devised a method of devising a zoom type such as making the movement spaces of a variator and a compensator common to each other or a method of proportionally reducing an afocal zoom portion. In contrast, as regards making the relay portion compact, there has not yet been devised a particularly effective means.

SUMMARY OF THE INVENTION

It is an object of the present invention to provide a zoom lens whose entire system has been made compact by making the relay portion thereof compact.

It is another object of the present invention to provide a zoom lens which has been made compact with the optical performance of its entire system maintained.

It is still another object of the present invention to provide a zoom lens which is excellent in manufacturing cost and in the ease of assembly.

The zoom lens according to the present invention achieves the above objects by disposing a compound-eye optical system having an erecting one-to-one magnification imaging function in the relay portion of the zoom lens. The compound-eye optical system includes a transparent convergent light transmitting body element such as SELFOC (registered trademark of Nippon Sheet Glass Co., Ltd.) in which the refractive index varies radially, a bar lens or a combination of two or more other lenses.

The present invention will become more fully apparent from the following detailed description thereof taken in conjunction with the accompanying drawings.

DESCRIPTION OF THE PREFERRED EMBODIMENTS

Figure 1:
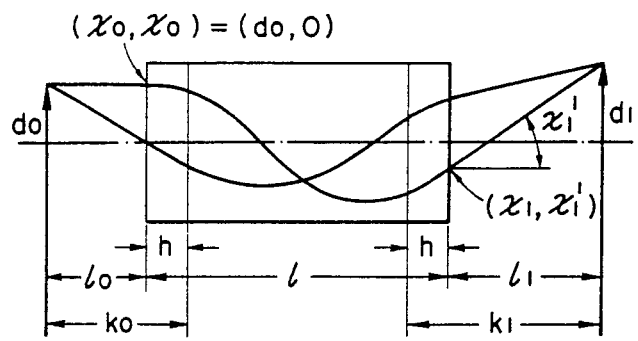
FIGS. 1 and 2 illustrate an erecting one-to-one magnification imaging optical system such as Selfoc.

FIG. 1 illustrates the manner in which light rays pass through a convergent light transmitting body which is an embodiment of a compound-eye optical system used in the zoom lens of the present invention. FIG. 1 also shows the manner in which the image of an object of size $d_0$ lying at a distance $l_0$ forwardly of the transmitting body having a full length of l is formed at a distance $l_1$ rearwardly of the transmitting body with a size $d_1$. h represents the distance from the end surface of the transmitting body to the principal point, and $k_0$ and $k_1$ represent the distances from the forward and rearward principal points to the object and the image, respectively. $x_0$, $x_1$; $x_0'$, $x_1'$ respectively represent the distances and angles of the incident and emergent light rays on the forward and rearward end surfaces of the transmitting body from the optical axis.

When the refractive index distribution n in the transmitting body is expressed as follows:

$$n = n_0 \left(1 - \frac{a}{2} x^2\right) \quad (1)$$

the relation between $x_0$, $x_0'$ and $x_1$, $x_1'$ is expressed as follows:

$$\begin{pmatrix} x_1 \\ x_1' \end{pmatrix} = \begin{pmatrix} \cos\sqrt{a}\, l & \frac{1}{\sqrt{a}} \sin\sqrt{a}\, l \\ -\sqrt{a} \sin\sqrt{a}\, l & \cos\sqrt{a}\, l \end{pmatrix} \begin{pmatrix} x_0 \\ x_0' \end{pmatrix} \quad (2)$$

where $n_0$ represents the refractive index on the optical axis, and a represents the refractive index distribution constant.

Also, the focal distance f, the principal point position h and the imaging formula between $l_0$ and $l_1$ can be expressed as follows:

$$f = \frac{1}{\sqrt{a}\, n_0 \sin\sqrt{a}\, l} \quad (3)$$

$$h = \frac{1}{n_0 \sqrt{a}} \tan\frac{\sqrt{a}}{2} l \quad (4)$$

$$l_1 = \frac{1}{n_0 \sqrt{a}} \times \frac{\sin\sqrt{a}\, l + n_0 \sqrt{a}\, l_0 \cos\sqrt{a}\, l}{n_0 \sqrt{a}\, l_0 \sin\sqrt{a}\, l - \cos\sqrt{a}\, l} \quad (5)$$

Figure 2:
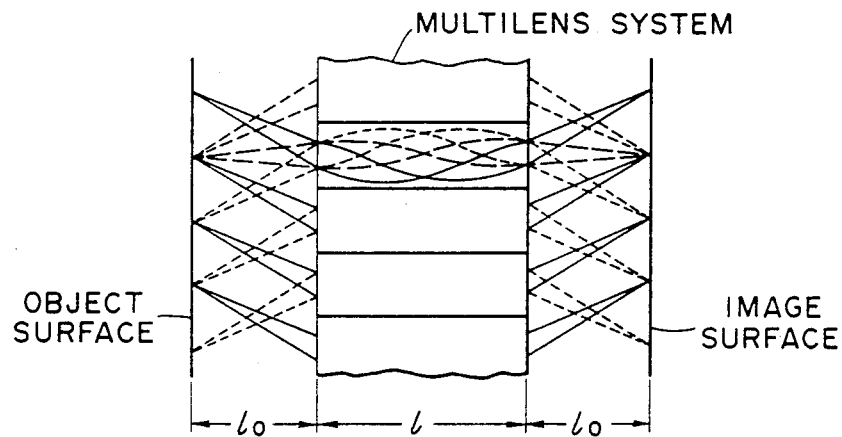

FIG. 2 is a view in which the light transmitting body is arranged one-dimensionally or two-dimensionally, and it shows a condition in which a plurality of transmitting bodies contribute to the imaging of a point.

Where a light transmitting body array, for example, a Selfoc array (hereinafter referred to as SLA) which is a graded index fiber bundle, is used as the image system, it is preferable for continuity of the image that the imaging be erect one-to-one magnification imaging. The present invention devises means for causing the imaging by the SLA to have the role as the relay portion of a zoom lens while keeping erect one-to-one magnification imaging.

Figure 3:
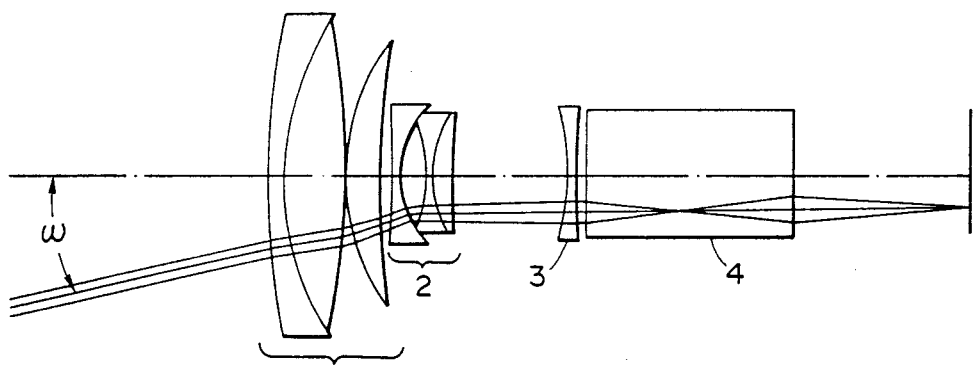
FIGS. 3 and 4 illustrate the zoom lens according to the present invention.

FIG. 3 shows the construction of an embodiment of a zoom lens system using SLA as the relay portion. The invention will now be described with reference to FIG. 3. A zoom portion comprising a focusing lens 1 having a positive refractive power, a variator 2 having a negative refractive power and effecting the magnification changing action and a compensator 3 having a negative refractive power and correcting the movement of the focus resulting from the magnification changing action, and a relay portion 4 including an SLA optical system disposed rearwardly of the zoom portion which together constitute a zoom lens system and, in this case, a first requirement of the relay portion including the SLA optical system is that the imaging magnification of the SLA optical system alone be 'time. The SLA optical system must divisionally image an object and reproduce an image similar to the object on the imaging plane. An ordinary relay lens forms an inverted image and therefore, if an object is divisionally imaged and re-synthesized, the continuity of the image will be lost and it will become impossible to form an image similar to the object.

In the present invention, an erecting one-to-one magnification image can be formed by appropriately selecting the values of the refractive index distribution factor a in the individual fiber elements of SLA, the fiber length l, the object distance $l_0$ and the object height $d_0$ and at the same time, an image similar to the object can be reproduced while keeping the continuity of the image. Moreover, when a device such as SLA is used as the erecting one-to-one magnification optical system, a single block only need be held and this leads to simplicity of structure and ease of manufacture. A second requirement of the relay portion including SLA is that the optical system disposed forwardly of the SLA be constructed into a substantially telecentric system. In some cases, SLA becomes incapable of transmitting light depending on the angle of the light entering from the object and thus, it becomes necessary that the position of the exit pupil of the portion disposed forwardly of the SLA be made to lie at infinity.

Description will now be made of means for constructing the zoom lens system while satisfying the above-described requirements. First, it is desirable that the zoom portion comprise three lens groups, namely, a first positive lens group, a second negative lens group and a third negative lens group, or a first negative lens group, a second positive lens group and a third negative lens group. To satisfy the first requirement, it is necessary that the imaging position by the zoom portion be coincident with the conjugate position of a film or an image pick-up element with respect to the optical system subsequent to SLA and that the image of the object by the zoom portion be a virtual image so that the full length of the system is not great. There is arranged in succession from the object side, a positive focusing lens, a negative variator, and a negative compensator or a positive focusing lens and a compensator, a negative variator, and a negative fixed lens and, in succession from the object side, a negative focusing lens, a positive variator, and a negative compensator or a negative focusing lens and a compensator, a positive variator, and a negative fixed lens satisfies this condition. Further, if the condition of erecting one-to-one magnification imaging is substituted into equation (5), there is obtained.

$$l_0 = \frac{\cos \sqrt{a}\, l + 1}{n_0 \sqrt{a} \sin \sqrt{a}\, l} \tag{6}$$

Figure 4:
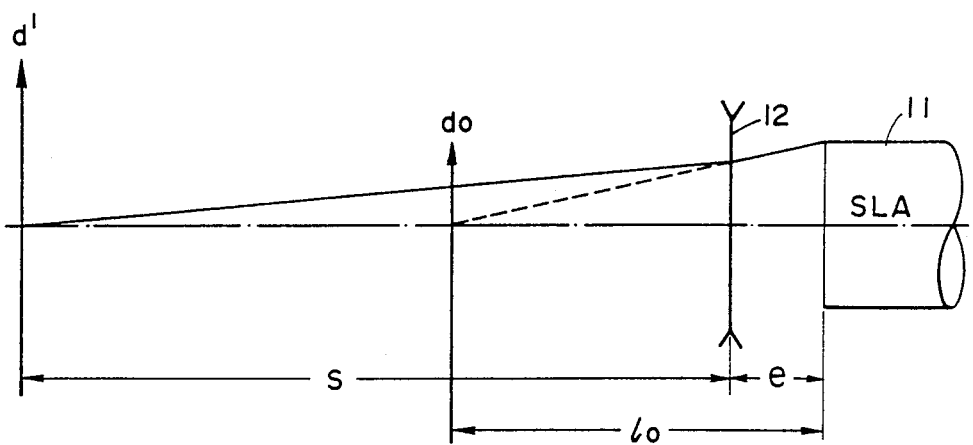

If the refractive index distribution and the focal distance are given, $l_0$ may be obtained by equation (6). After $L_0$ has been obtained, it is necessary to determine the refractive power of the third group so that the zoom portion is constructed into a telecentric system. If, as shown in FIG. 4, the size of the object (the image by the zoom portion) relative to SLA 11 is $d_0$ and the size of the image of the object by the variator of the zoom portion is d' and the position of the image is S from the forward principal point of the third group 12 and the distance from the rearward principal point of the third group 12 to the forward surface of SLA 11 is e, then there is obtained:

$$\frac{S - e}{l_0} = \frac{d'}{d_0} \quad d' = f_1 \tan\omega \cdot \beta_2 = \frac{f_1 d_0}{f} \beta_2$$

and the following relations are obtained:

$$\frac{S - e}{l_0} = \frac{f_1 \beta_2}{f} \tag{7}$$

$$f_3 = \frac{S(l_0 + e)}{S + l_0 + e} \tag{8}$$

where $f_1$: focal distance of the first lens group,
$\beta_2$: lateral magnification of the second lens group,
$f_3$: focal distance of the third lens group.

By determining the focal distance of the third lens group 12 from equations (6), (7) and (8), there can be obtained a zoom portion which causes the principal ray as shown in FIG. 3 to enter SLA in parallel to the optical axis.

Embodiments 1, 2 and 3 of the zoom lens according to the present invention will now be shown. In each embodiment, $r_i$ represents the radius of curvature of the i-th surface, $d_i$ represents the on-axis thickness or air space between the i-th surface and the i+1-th surface, $\nu d$ represents the abbe number, and nd represents the refractive index. f represents the focal distance of the zoom portion, and $S_1$, $S_2$ and $S_3$ represent variable on-axis spacings.

Figure 5:
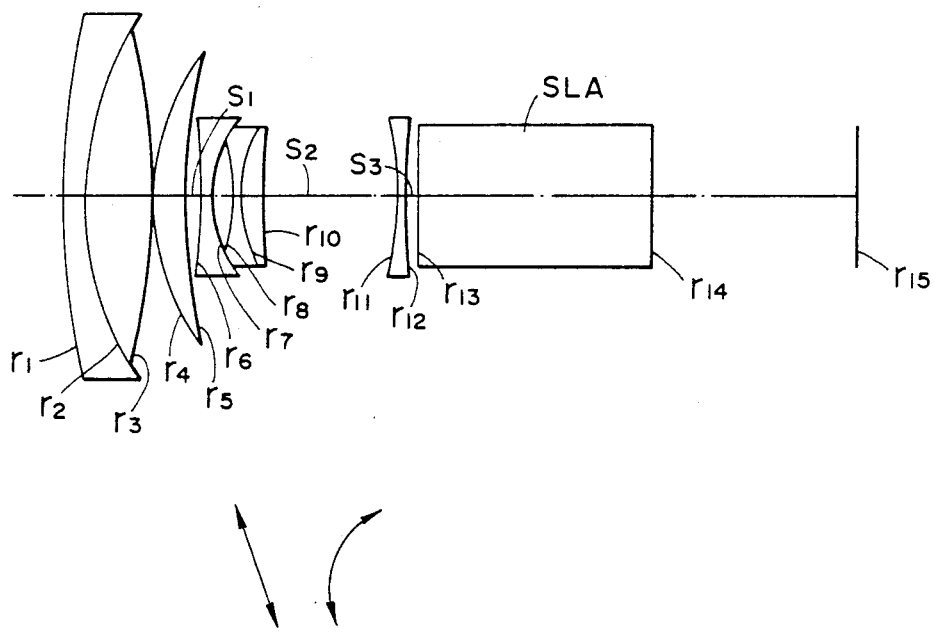
FIG. 5 is a lens cross-section showing a first embodiment of the zoom lens according to the present invention.
Figure 7:
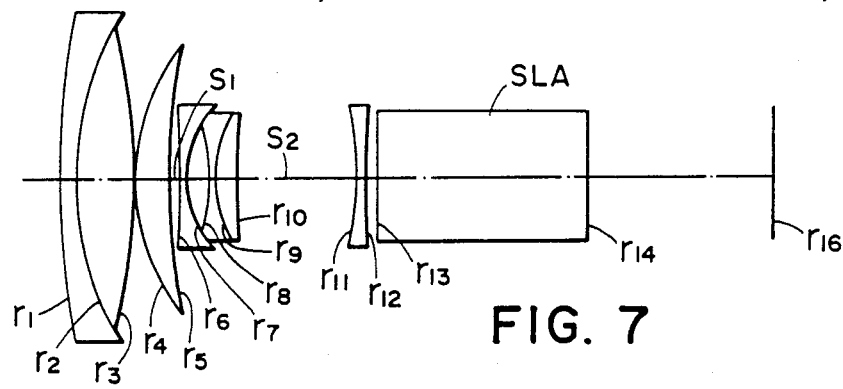
FIG. 7 is a lens cross-section showing a second embodiment of the zoom lens according to the present invention.
Figure 8:
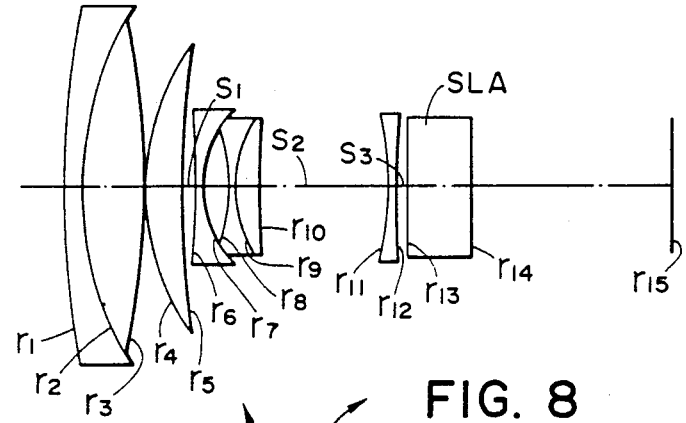
FIG. 8 is a lens cross-section showing a third embodiment of the zoom lens according to the present invention.

The lens cross-section of the first embodiment is shown in FIG. 5, the lens cross-section of the second embodiment is shown in FIG. 7, and the lens cross-section of the third embodiment is shown in FIG. 8.

Figure 6A:
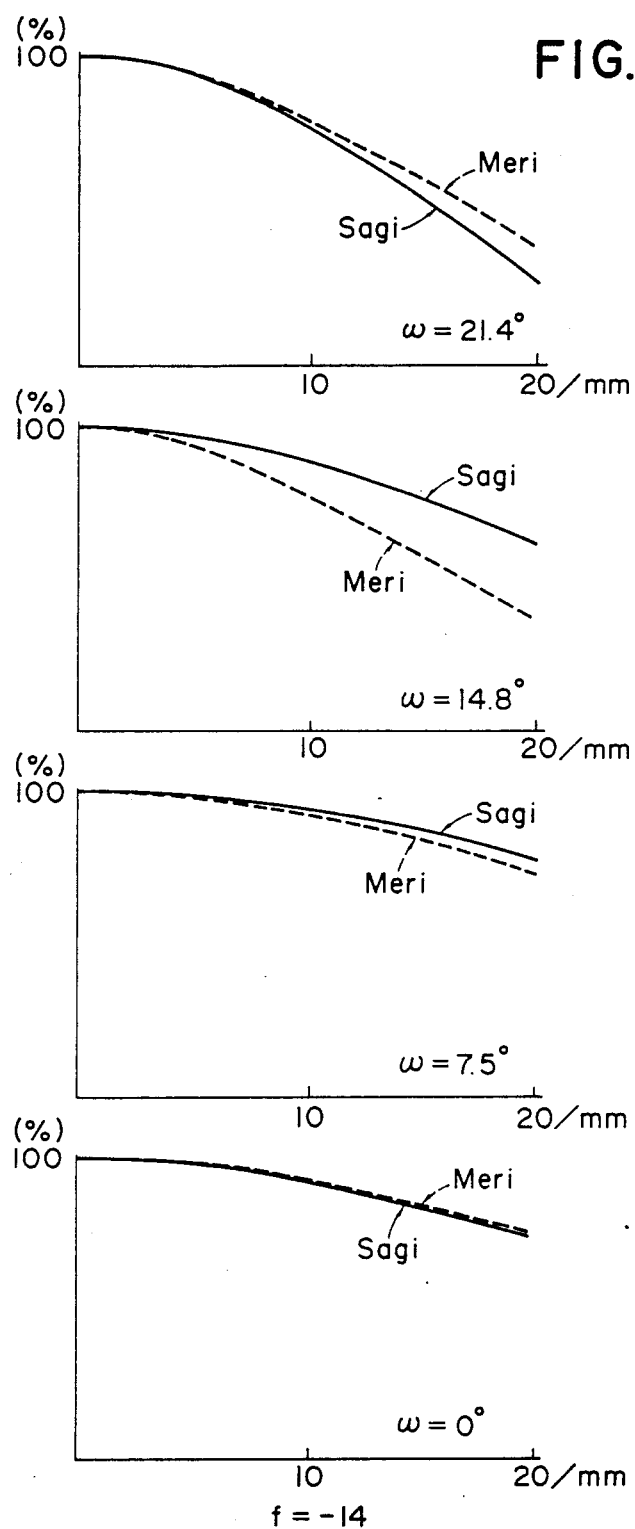
FIGS. 6A and 6B show MTF of the zoom lens according to the first embodiment.
Figure 6B:
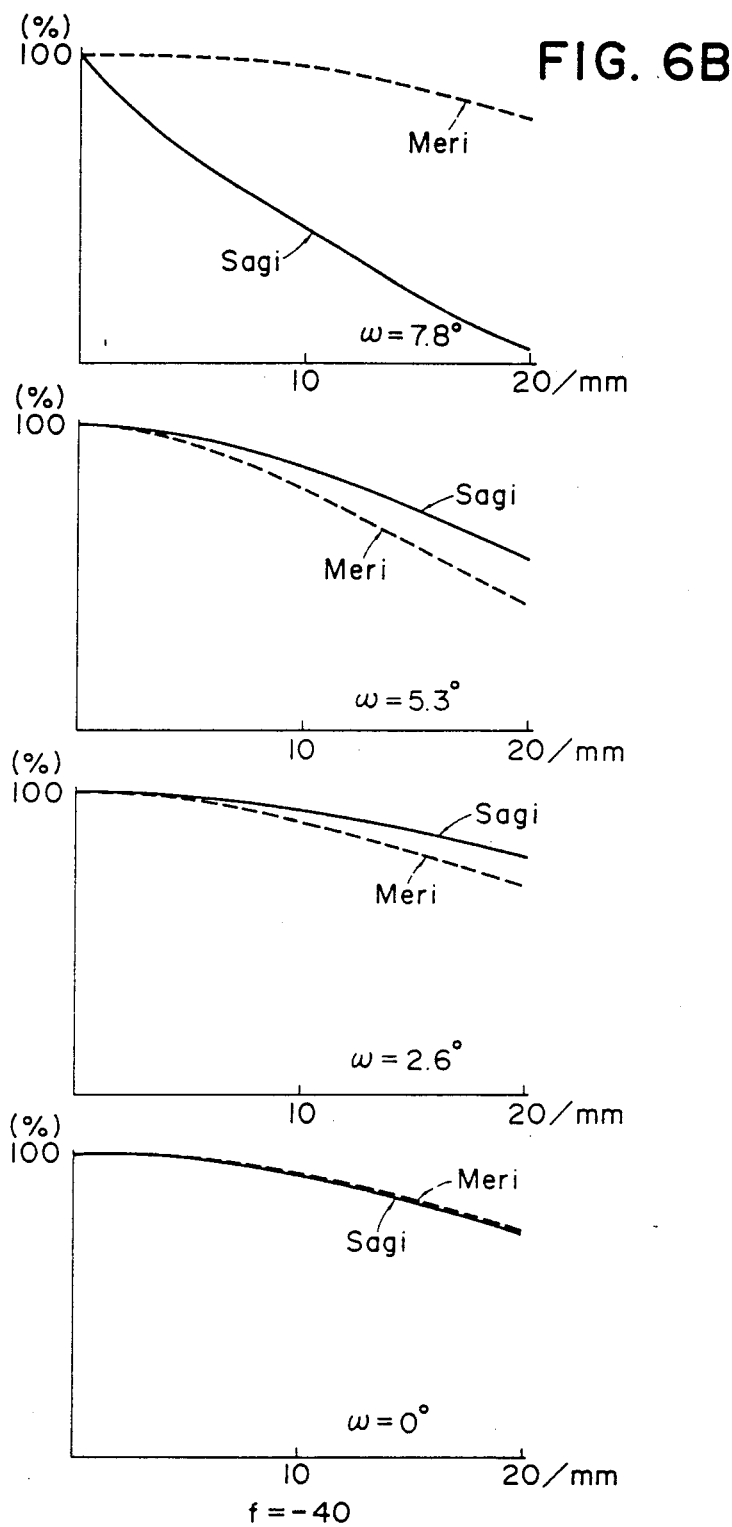

FIGS. 6A and 6B are modulation transfer functions showing the imaging performance of the first embodiment, FIG. 6A showing the values of respective light beams relative to the incident angle ω when f= −14, and FIG. 6B showing the values of respective light beams relative to the incident angle ω when f= −40. In FIG. 6, the solid line represents the MTF in the sagittal cross-section and the dotted line represents the MTF in the meridional cross-section.

| First Embodiment (FIGS. 5 and 6A, 6B) | | | | |
|---|---|---|---|---|
| Surface No. | r | d | $\nu_d$ | $n_d$ |
| 1 | 103.693 | 2.00 | 25.40 | 1.80518 |
| 2 | 36.803 | 7.44 | 61.00 | 1.58913 |
| 3 | −90.863 | 0.12 | | 1. |
| 4 | 27.115 | 4.40 | 61.00 | 1.58913 |
| 5 | 96.972 | $S_1$ | | 1. |
| 6 | −921.159 | 0.90 | 58.20 | 1.62299 |
| 7 | 11.497 | 3.38 | | 1. |
| 8 | −18.128 | 0.90 | 64.10 | 1.51633 |
| 9 | 15.291 | 2.63 | 25.40 | 1.80518 |
| 10 | 76.146 | $S_2$ | | 1. |
| 11 | −29.991 | 1.00 | 64.10 | 1.51633 |
| 12 | 375.056 | $S_3$ | | 1. |
| 13 | ∞ | 1 | — | $n_0$ |
| 14 | ∞ | $l_1$ | | |

-continued

First Embodiment (FIGS. 5 and 6A, 6B)

| 15 | Image surface | | |
|---|---|---|---|
| | $f = -14.0$ | $f = -28.0$ | $f = -40.0$ |
| $S_1$ | 1.791 | 11.810 | 15.623 |
| $S_2$ | 16.000 | 4.199 | 2.186 |
| $S_3$ | 1.356 | 3.137 | 1.337 |

Data of SLA
$n_0 = 1.538$
$a = 0.0161$
$l = 27.946$
$l_0 = l_1 = 25.0$
Diameter 1.05 mm $\phi$ Second Embodiment (FIG. 7)

| Surface No. | r | d | $\nu_d$ | $n_d$ |
|---|---|---|---|---|
| 1 | 112.031 | 2.00 | 25.40 | 1.80518 |
| 2 | 37.259 | 7.52 | 61.00 | 1.58913 |
| 3 | −76.410 | 0.12 | | 1. |
| 4 | 25.085 | 4.51 | 58.20 | 1.62299 |
| 5 | 67.808 | $S_1$ | | 1. |
| 6 | −953.365 | 0.90 | 61.00 | 1.58913 |
| 7 | 11.473 | 3.24 | | 1. |
| 8 | −19.418 | 0.72 | 61.00 | 1.58913 |
| 9 | 14.172 | 2.69 | 25.40 | 1.80518 |
| 10 | 72.777 | $S_2$ | | 1. |
| 11 | −29.991 | 1.00 | 64.10 | 1.51633 |
| 12 | 1318.117 | 1.29 | | 1. |
| 13 | ∞ | l | — | $n_0$ |
| 14 | ∞ | $l_1$ | | |
| 15 | Image surface | | | |
| | $f = -14.0$ | $f = -28.0$ | $f = -40.0$ | |
| $S_1$ | 1.436 | 11.475 | 14.487 | |
| $S_2$ | 16.000 | 8.863 | 2.745 | |

Data of SLA
$n_0 = 1.538$
$a = 0.0161$
$l = 27.946$
$l_0 = l_1 = 25.0$
Diameter 1.05 mm $\phi$ Third Embodiment (FIG. 8)

| Surface No. | r | d | $\nu_d$ | $n_d$ |
|---|---|---|---|---|
| 1 | 103.693 | 2.00 | 25.40 | 1.80518 |
| 2 | 36.803 | 7.44 | 61.00 | 1.58913 |
| 3 | −90.863 | 0.12 | | 1. |
| 4 | 27.115 | 4.40 | 61.00 | 1.58913 |
| 5 | 96.972 | $S_1$ | | 1. |
| 6 | −921.159 | 0.90 | 58.20 | 1.62299 |
| 7 | 11.497 | 3.38 | | 1. |
| 8 | −18.128 | 0.90 | 64.10 | 1.51633 |
| 9 | 15.291 | 2.63 | 25.40 | 1.80518 |
| 10 | 76.146 | $S_2$ | | 1. |
| 11 | −29.991 | 1.00 | 64.10 | 1.51633 |
| 12 | 375.056 | $S_3$ | | 1. |
| 13 | ∞ | $l_0$ | — | $n_0$ |
| 14 | ∞ | $l_1$ | | |
| 15 | Image surface | | | |
| | $f = -14.0$ | $f = -28.0$ | $f = -40.0$ | |
| $S_1$ | 1.791 | 11.810 | 15.623 | |
| $S_2$ | 16.000 | 4.199 | 2.186 | |
| $S_3$ | 1.356 | 3.137 | 1.337 | |

Figure 9:
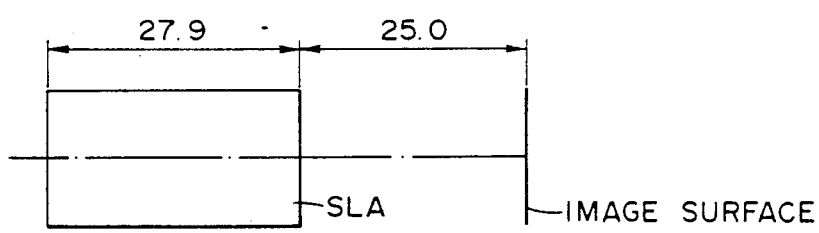
FIG. 9 illustrates a Selfoc lens array used in the embodiments of the present invention.
Figure 9:
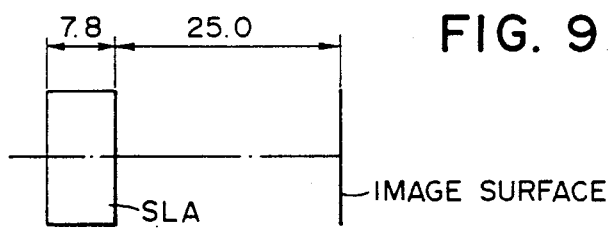

Data of SLA
$n_0 = 1.563$
$a = 0.175$
$l = 7.802$
$l_0 = l_1 = 25.0$
Diameter 1.05 mm $\phi$ FIG. 9 illustrates the SLA shown in the foregoing embodiments. As is apparent from FIG. 9, by using SLA having a great refractive index gradient, the length of the SLA itself can be reduced and the full length of the relay portion can be reduced.

Generally, a convergent light transmitting fiber of great refractive index gradient has great spherical aberration and sometimes makes it difficult to obtain a high resolving power, but correction can be made as by making the shape of the end surface of the fiber spherical or non-spherical and/or varying the shape of the refractive index gradient.

Also, a similar effect can be expected even if a compound-eye optical system such as a usual fly's eye lens or bar lens is employed instead of SLA.

What we claim is:

1. A zoom lens, comprising:
   a zoom portion for forming a virtual image of an object lying between infinity and a very short distance always at a predetermined position and for varying the imaging magnification of the virtual image, said zoom portion being constructed so that the principal ray of each light ray emitted from said zoom portion be substantially parallel to the optical axis thereof; and
   a relay portion including an erecting one-to-one magnification compound-eye optical system disposed between said zoom portion and an image surface for forming a real image of the virtual image of said object on the image surface, said relay portion being fixed during the zooming operation.

2. A zoom lens according to claim 1, wherein said zoom portion comprises, in succession from the object side to the image side, a focusing lens having a positive refractive power, a variator having a negative refractive power, and a compensator having a negative refractive power.

3. A zoom lens according to claim 1, wherein said zoom portion comprises, in succession from the object side to the image side, a lens having a positive refractive power and provided with a focusing function and a compensator function, a variator having a negative refractive power, and a fixed lens having a negative refractive power.

4. A zoom lens according to claim 1, wherein said zoom portion comprises, in succession from the object side to the image side, a focusing lens having a negative refractive power, a variator lens having a positive refractive power, and a compensator having a negative refractive power.

5. A zoom lens according to claim 1, wherein said zoom portion comprises, in succession from the object side to the image side, a lens having a negative refractive power and provided with a focusing function and a compensator function, a variator having a positive refractive power, and a negative fixed lens.

6. A zoom lens, comprising:
   a front lens group for forming a virtual image of an object lying between infinity and a very short distance always at a predetermined position and for varying the imaging magnification of the image of the object on an image surface, the exit pupil of said front lens group lying substantially at infinity on the object side relative to the image surface; and
   a convergent light transmitting body array for causing the virtual image of the object formed by said front lens group to be re-imaged as an erecting one-to-one magnification image on the image surface, said convergent light transmitting body array being disposed between said front lens group and the image surface and being fixed during the zooming operation.

7. A zoom lens according to claim 6, wherein said convergent light transmitting body array is a graded index fiber.

* * * * *